United States Patent Office.

LAUREN B. ARNOLD, OF LANSING, NEW YORK.

*Letters Patent No. 91,298, dated June 15, 1869.*

IMPROVED MODE OF PREPARING RENNET FOR USE IN MAKING CHEESE.

The Schedule referred to in these Letters Patent and making part of the same.

*To all whom it may concern:*

Be it known that I, LAUREN B. ARNOLD, of Lansing, Tompkins county, New York, have invented an Improved Mode of Preparing Rennet for Use in Making Cheese; and I do hereby declare the following is a full and exact description thereof.

My object is, mainly, to collect the coagulable principle of the rennet, free from animal impurities, and thus make a better cheese.

This I accomplish by filtering a solution of rennet through a layer of charcoal, whereby I obtain a liquid, clear, sweet, and yet having all the virtues of the rennet.

My mode of thus purifying rennet is, to take the usual salted and dried stomachs of calves, and dissolve them, as far as possible, in water, or in water a little warmed. To facilitate the solution, I cut them in narrow strips, or otherwise subdivide them. And on the bottom of a square box, or form, I stretch one or more layers of muslin or common cloth, held up by a frame, or I use a hoop, with a cone-shaped bag suspended therefrom, or construct a tight box, with a filter on a form, or the bag, and with perforated metallic plates above the filter or bag, and arrange a collecting-basin at the bottom, the whole being enclosed, so as to be a portable purifier.

In all these forms I spread, on the muslin or cone bag, a not very thick layer of pulverized charcoal. The charcoal may be either of wood or bone, but if used too caustic, or too fresh, will injure the coagulable power of the rennet. Therefore, as part of my invention, I saturate the charcoal by water, or exposure to air, or by rennet itself. No precise rule, not founded on experience, for this need be named, as it is soon acquired.

Thus prepared, I slowly filter the solution of rennet through the apparatus described, and the result is a clarified solution, free of most animal matter, and, though not absolutely clear, is nearly so, and having the full power of the rennet.

The advantages and uses of my invention are apparent to those skilled in the art to which it appertains.

Claims.

1. The use of charcoal filters, made as described, in combination with layers of charcoal, prepared substantially as and for the purposes set forth, in clarifying rennet for use.

2. The purified and salted rennet, made and fitted for use, substantially in the manner and for the purposes set forth.

LAUREN B. ARNOLD.

Witnesses:
SAMUEL J. PARKER,
O. G. HOWARD.